United States Patent [19]
Niki

[11] Patent Number: 6,138,610
[45] Date of Patent: Oct. 31, 2000

[54] SMALL ANIMAL BREEDING APPARATUS

[75] Inventor: Motohiro Niki, 22-11, Yushima 2-Chome, Bunkyo-Ku, Tokyo-To, Japan

[73] Assignees: Motohiro Niki; Etuko Niki; Mieko Niki, all of Tokyo-To; Atsushi Kidachi; Misako Kidachi, both of Chiba-Ken, all of Japan

[21] Appl. No.: 09/363,346

[22] Filed: Jul. 28, 1999

[30] Foreign Application Priority Data

Mar. 5, 1999 [JP] Japan ................................. 11-058961

[51] Int. Cl.$^7$ ...................................................... A01K 1/03
[52] U.S. Cl. ........................................... 119/418; 119/455
[58] Field of Search .................... 119/418, 448, 119/455, 503

[56] References Cited

U.S. PATENT DOCUMENTS

| | | | |
|---|---|---|---|
| 4,402,280 | 9/1983 | Thomas | 119/418 |
| 5,048,459 | 9/1991 | Niki et al. | 119/418 |
| 5,307,757 | 5/1994 | Coiro, Sr. et al. | 119/418 |
| 5,349,923 | 9/1994 | Sheaffer et al. | 119/418 |
| 5,385,118 | 1/1995 | Coiro, Sr. et al. | 119/418 |
| 5,954,013 | 9/1999 | Gabriel et al. | 119/418 |

*Primary Examiner*—Peter M. Poon
*Assistant Examiner*—Elizabeth Shaw
*Attorney, Agent, or Firm*—Ladas & Parry

[57] ABSTRACT

A small animal breeding apparatus has a frame structure in which a number of breeding spaces are defined. Each breeding space is provided with a pair of parallel guide rails fixed to the opposite inner sides of the breeding space and extending from the front side to the rear side. A breeding box provided in each breeding space has on opposite outer sides protrusions which are supported on the guide rails, respectively, for guided sliding movement. A breeding cage having an upper opening is placed on the bottom floor of the breeding box. An air supply pipe and an air exhaust pipe extend forward from the rear of the frame structure. When the breeding box is pushed rearward into the breeding space in guided movement along the guide rails, the air supply and exhaust pipes are caused to extend into the breeding box through insertion holes formed in a rear wall of the breeding box. In this state, the air supply and exhaust pipes are located immediately above the breeding cage, and fresh air supplied through the air supply pipe is caused to flow downward into the breeding cage. The fresh air is circulated in the breeding cage and sucked into the air exhaust pipe, so that air in the breeding cage is maintained clean.

6 Claims, 3 Drawing Sheets

SMALL ANIMAL BREEDING APPARATUS

BACKGROUND OF THE INVENTION

1. Field of the Invention

This invention relates to a small animal breeding apparatus in which small animals such as mice and rats for use in experiments are bred.

2. Description of the Prior Art

An apparatus shown in FIG. 3 through FIG. 5 is known as a conventional small animal breeding apparatus. This small animal breeding apparatus has a frame 2 of rectangular parallelepiped shape made of angle bars, shelves 3 which divide the interior space of the frame 2 into a plurality of vertically arranged stages, a plurality of breeding spaces 4 which are formed above the shelves 3, respectively, breeding cages 5 each of which is placed in each breeding space 4, and air exhaust holes 8 which open at the rear of each breeding space 4.

In the conventional small animal breeding apparatus 1 constructed as above, when the breeding cages 5 are placed in the breeding spaces 4 and an exhaust system not shown is operated, air is taken from the front of each breeding space 4, sent to the inside of the space 4, and then sucked into an exhaust pipe through each exhaust hole 8. Thus, air fouled by the small animals in the breeding cages 5 can be discharged.

In the above described conventional small animal breeding apparatus 1, a problem exists in that the breeding cages 5 are not fully ventilated, because the front side of each breeding space 4 is open, and fresh air taken into each space 4 from the front side of the frame under the sucking action by the exhaust hole 8 is sent to the rear of each space, while passing through the region above each breeding cage 5, and is directly discharged through the exhaust hole 8 without circulating in the interior of the cage 5. For this reason, foul air in each breeding cage 5 stagnates and is not discharged to the outside, and the breeding cage 5 is not sufficiently ventilated.

This invention is made to solve the above problem and its object is to provide a small animal breeding apparatus that can always keep air clean in the breeding cages.

SUMMARY OF THE INVENTION

According to this invention, there is provided a small animal breeding apparatus comprising: a frame structure in a parallelpiped shape having a front side and a rear side: breeding spaces provided in the frame structure; guide means fixedly provided in each of the breeding spaces and extending from the front side to the rear side: an air supply pipe fixed to and extending from the rear side of the frame structure toward the front side; a breeding box placed in each of the breeding spaces for guided movement by the guide means between the front side and the rear side, the breeding box having a top wall, a bottom floor and a rear wall through which is formed an insertion hole which is so positioned as to allow the air supply pipe to pass therethrough into the breeding box when the breeding box is moved from the front side toward the rear side in the guided movement; and a breeding cage put on the floor of the breeding box and having an upper opening, the air supply pipe extending in the breeding box at a height immediately above the upper opening of the breeding cage and having nozzle holes directed to the upper opening of the breeding cage.

DESCRIPTION OF THE PREFERRED EMBODIMENT

Figure 1:
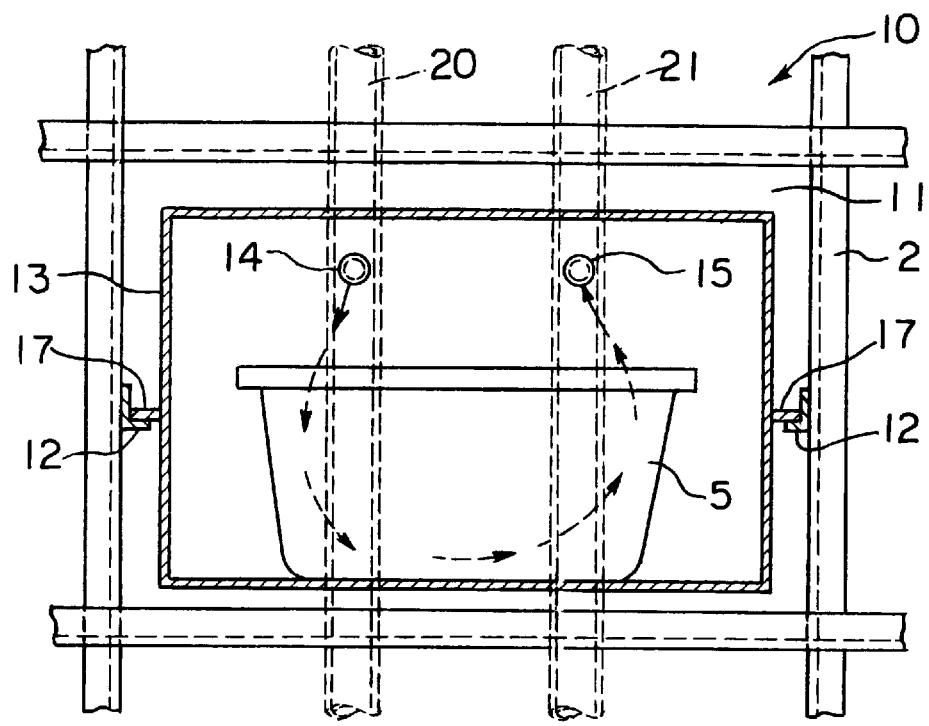
FIG. 1 is a fragmentary front view of a small animal breeding apparatus in an embodiment of this invention.

An embodiment of the small animal breeding apparatus according to this invention will be described with reference to FIG. 1 and FIG. 2. The breeding apparatus is generally designated 10 and has a frame 2 which is the same as in the conventional breeding apparatus shown in FIG. 3. Therefore, further description thereof will not be made.

The frame 2 has a plurality of breeding spaces 11 therein, and horizontal guide rails 12 having, for example, an L-shaped cross section are fixedly secured to both the inner sides of each of the breeding spaces 11 so as to extend from the front to the rear of the frame 2.

A breeding box 13 is provided within each breeding space 11. The breeding box 13 has the shape of a rectangular parallelpiped, and the front portion of the box 13 is open. The breeding box 13 has a top wall, a bottom floor and a rear wall having two insertion holes 16 for an air supply pipe 14 and an air exhaust pipe 15. These holes 16 are disposed side by side. Protrusions 17 are provided horizontally from the front toward the rear of the box 13 on the two side walls of the box 13. The protrusions 17 are slidably supported on the guide rails 12, respectively. A breeding cage 5 having an upper opening is put on the bottom floor of the breeding box 13. A door-flap 13a, which can be opened and closed, may be attached in the front opening of the breeding box 13.

The air supply pipe 14 and the air exhaust pipe 15 extend horizontally at a lateral distance from the rear toward the front of the breeding space 11. As shown in FIG. 1, the air supply pipe 14 is located adjacent a lateral side of the breeding cage 5 and the air exhaust pipe 15 is located adjacent the other side of the breeding cage 5. When the breeding box 13 is slid into the breeding space 11 from the front to the rear with the protrusions 17 being slidingly supported on the guide rails 12, respectively, the air supply pipe 14 and air exhaust pipe 15 are passed through the insertion holes 16, respectively, and take height positions that are immediately above the upper opening of the breeding cage 5 placed in the breeding box 13. Nozzle holes 18, each facing downward, are provided in the air supply pipe 14, and air exhaust holes directed downward are provided in the air exhaust pipe 15 at suitable spacings in the longitudinal direction of the pipes. On each of the portions of the air supply pipe 14 and the air exhaust pipe 15 fitted in the insertion holes 16, an elastic plug 19 of conical frustum shape made of a plastic material as shown in FIG. 2 is firmly fitted in abutment with a stop ring 22 so as to be immovable longitudinally of the pipes. The air supply pipe 14 is connected to an air supply main pipe 20, and the air exhaust pipe 15 is connected to an exhaust main pipe 21.

Figure 2:
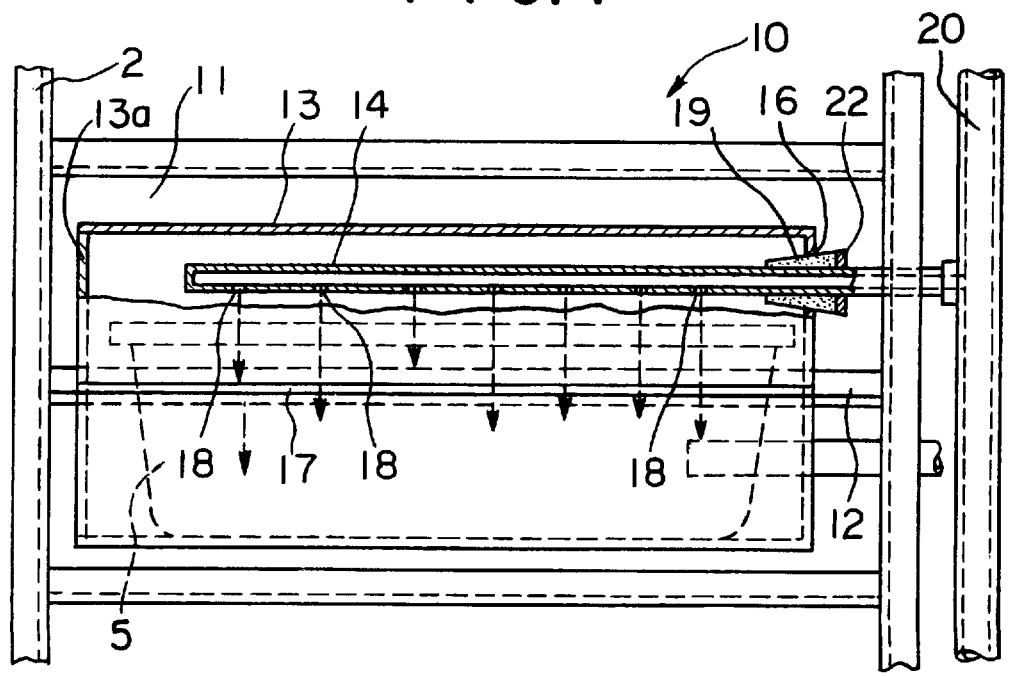
FIG. 2 is a side view, partly in vertical section, of the small animal breeding apparatus shown in FIG. 1.
Figure 3:
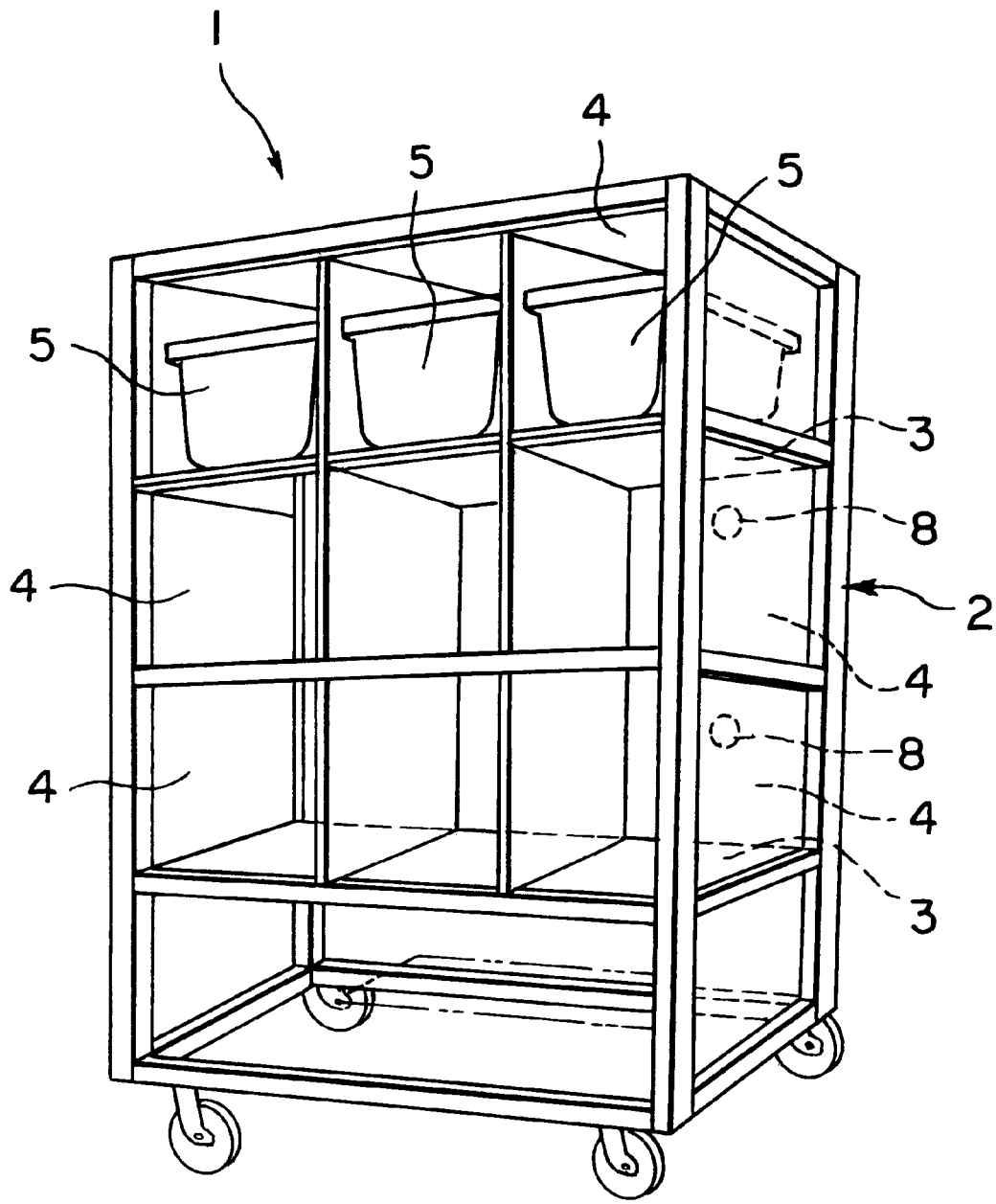
FIG. 3 is a perspective view showing a conventional small animal breeding apparatus.
Figure 4:
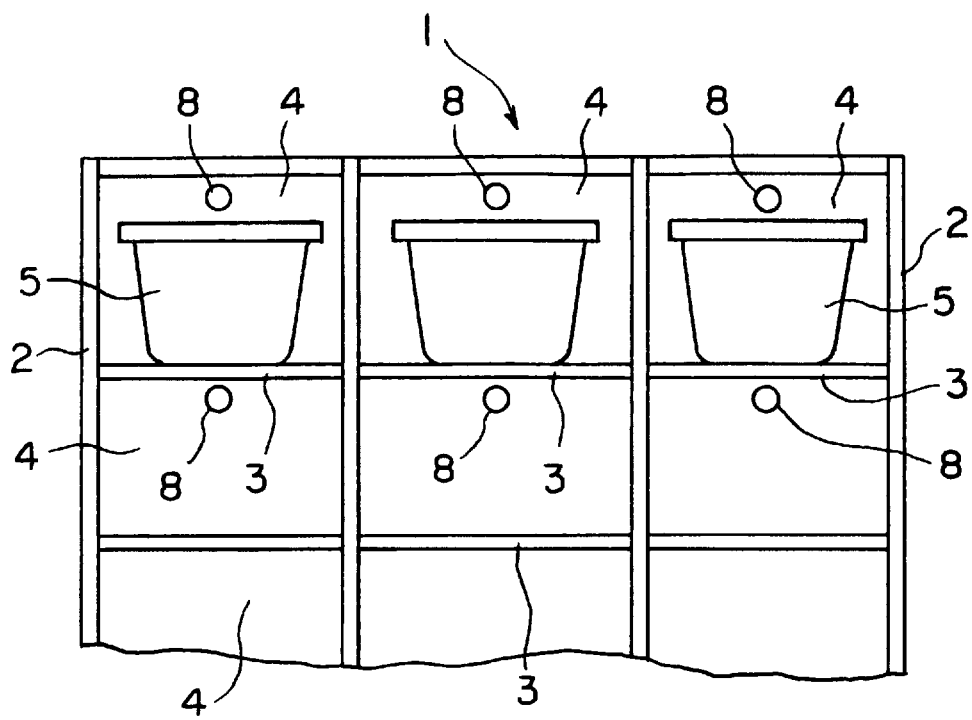
FIG. 4 is a fragmentary front view of the small animal breeding apparatus shown in FIG. 3.
Figure 5:
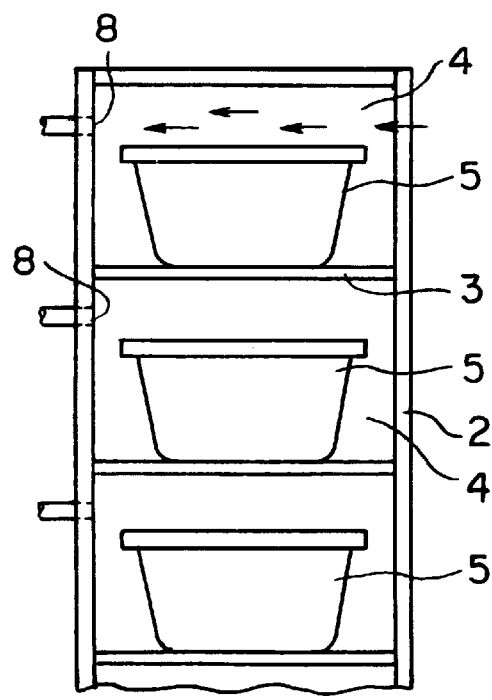
FIG. 5 is a side view of the apparatus shown in FIG. 4.

The small animal breeding apparatus 10 being constructed as above, when the breeding cage 5 is placed in the breeding box 13, the protrusions 17 of the breeding box 13 are put on the guide rails 12, respectively, and then the box 13 is pushed to the rear of the breeding space 11, the plugs 19 on the air supply pipe 14 and air exhaust pipe 15 are inserted into the insertion holes 16 of the box 13, and the air supply pipe 14 and air exhaust pipe 15 come automatically immediately above the upper opening of the breeding cage 5 as shown in FIG. 2. At this time, the plugs 19 are fit in the insertion holes 16 in a sealed condition. When the air supplying system not shown in the drawings is operated in this state, fresh air blows downward into the breeding cage 5 through the nozzle holes 18 of the air supply pipe 14, as shown by arrows in FIG. 2.

The fresh air blown downward into the breeding cage 5 circulates therein from one lateral side to the other of the cage 5 as shown in the FIG. 1, and is sucked from the holes of the air exhaust pipe 15 and discharged through exhaust main pipe 21. Thus, the breeding cage 5 is always supplied with fresh air.

Since the guide rails 12 are provided in the breeding space 11, the protrusions 17 of the breeding box 13 slide on the guide rails 12, the air supply pipe 14 and the air exhaust pipe 15 are correctly and easily inserted into the insertion holes 16 of the breeding box 13.

In the small animal breeding apparatus of this invention, due to the provision of the guide rails in the breeding space, the breeding box are guided thereby and can always be correctly positioned in the breeding space. Moreover, insertion and taking out of the breeding box can be made easily, and the fixed air supply pipe and air exhaust pipe can be inserted into the breeding box firmly and easily from behind. Furthermore, since the air supply pipe and the air exhaust pipe are located immediately above the upper opening of the breeding cage in the breeding box, fresh air is fully supplied into the breeding cage, and fouled air in the breeding cage is quickly discharged and does not stagnate there.

What is claimed is:

1. A small animal breeding apparatus comprising:

a frame structure in a parallelepiped shape having a front side and a rear side:

breeding spaces provided in said frame structure;

guide means fixedly provided in each of said breeding spaces and extending from said front side to said rear side:

an air supply pipe fixed to and extending from said rear side of the frame structure toward said front side;

a breeding box placed in each of said breeding spaces for guided movement by said guide means between said front side and said rear side, said breeding box having a top wall, a bottom floor and a rear wall through which is formed an insertion hole which is so positioned as to allow said air supply pipe to pass therethrough into said breeding box when the breeding box is moved from the front side toward the rear side in said guided movement; and a breeding cage put on the floor of the breeding box and having an upper opening, said air supply pipe extending in the breeding box at a height immediately above the upper opening of the breeding cage and having nozzle holes directed to the upper opening of the breeding cage.

2. The small animal breeding apparatus according to claim 1, further comprising:

an elastic plug of conical frustum shape fitted on said air supply pipe and in said insertion hole to provide a seal between the air supply pipe and the insertion hole.

3. The small animal breeding apparatus according to claim 1, further comprising:

an air exhaust pipe fixed to and extending from said rear side of the frame structure; and said breeding box having through said rear wall a second insertion hole which is so positioned as to allow said air exhaust pipe to pass therethrough into said breeding box when the breeding box is moved from the front side toward the rear side in said guided movement.

4. The small animal breeding apparatus according to claim 3, further comprising:

a second elastic plug of conical frustum shape fitted on said air exhaust pipe and in said insertion hole to provide a seal between the air exhaust pipe and the second insertion hole.

5. The small animal breeding apparatus according to claim 1, wherein:

said guide means includes guide rails attached to two inner sides of each of said breeding spaces; and said breeding box has on opposite sides thereof protrusions which are slidingly supported on said guide rails, respectively.

6. The small animal breeding apparatus according to claim 3, wherein:

said air supply pipe is located adjacent a lateral side of said breeding cage and said air exhaust pipe is located adjacent another lateral side of said breeding cage, whereby a circulating flow of air is produced within the breeding cage.

* * * * *